(12) United States Patent
Su et al.

(10) Patent No.: US 10,857,734 B2
(45) Date of Patent: Dec. 8, 2020

(54) 3D PRINTED PRODUCT POST-PROCESSING DEVICE

(71) Applicants: XYZPRINTING, INC., New Taipei (TW); KINPO ELECTRONICS, INC., New Taipei (TW)

(72) Inventors: Tzu-Hua Su, New Taipei (TW); Chien-Hsing Huang, New Taipei (TW); Shih-Jer Din, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 92 days.

(21) Appl. No.: 16/202,782

(22) Filed: Nov. 28, 2018

(65) Prior Publication Data

US 2020/0086576 A1   Mar. 19, 2020

(30) Foreign Application Priority Data

Sep. 17, 2018   (CN) .......................... 2018 1 1083096

(51) Int. Cl.
| | |
|---|---|
| *B29C 64/35* | (2017.01) |
| *B29C 64/153* | (2017.01) |
| *B29C 64/357* | (2017.01) |
| *B33Y 40/00* | (2020.01) |
| *B33Y 30/00* | (2015.01) |
| *B22F 3/105* | (2006.01) |

(52) U.S. Cl.
CPC ............ *B29C 64/35* (2017.08); *B29C 64/153* (2017.08); *B29C 64/357* (2017.08); *B22F 2003/1059* (2013.01); *B33Y 30/00* (2014.12); *B33Y 40/00* (2014.12)

(58) Field of Classification Search
None
See application file for complete search history.

(56) References Cited

U.S. PATENT DOCUMENTS

| | | | | |
|---|---|---|---|---|
| 3,343,555 A | * | 9/1967 | Kasner | ................... B08B 3/006 134/111 |
| 4,433,698 A | * | 2/1984 | Blaul | ................... B08B 15/026 134/102.1 |
| 8,099,814 B1 | * | 1/2012 | Harwerth | ............... B08B 3/006 15/21.1 |

(Continued)

*Primary Examiner* — Joseph S Del Sole
*Assistant Examiner* — Manley L Cummins, IV
(74) *Attorney, Agent, or Firm* — Chun-Ming Shih; HDLS IPR Services

(57) ABSTRACT

A 3D printed product post-processing device includes a main body, a lifting mechanism and a vacuum pipeline. An operating chamber is defined in the main body. A cavity and at least one primary recovery opening disposed adjacent to a side of the cavity are defined on a bottom surface of the operating chamber. At least one access hole is arranged on one side of the operating chamber and an operating window is arranged on the operating chamber. A floating powder recovery opening is arranged on top of the other side of the operating chamber. The lifting mechanism is accommodated in the cavity. The vacuum pipeline is respectively connected to the primary recovery opening and the floating powder recovery opening. The floating powders are removed through the floating powder recovery opening to maintain the operating window clean. Therefore, a post-processing operation can be facilitated.

11 Claims, 9 Drawing Sheets

(56) References Cited

U.S. PATENT DOCUMENTS

| | | | |
|---|---|---|---|
| 2012/0052145 A1* | 3/2012 | Chen | B08B 15/026 |
| | | | 425/217 |
| 2013/0052291 A1* | 2/2013 | Morikawa | B29C 64/357 |
| | | | 425/135 |
| 2019/0001413 A1* | 1/2019 | Golz | B29C 64/153 |
| 2019/0184432 A1* | 6/2019 | Dore | B33Y 40/00 |
| 2020/0055250 A1* | 2/2020 | Vodermair | B29C 64/379 |

* cited by examiner

3D PRINTED PRODUCT POST-PROCESSING DEVICE

BACKGROUND OF THE INVENTION

Field of the Invention

The technical field relates to a 3D printed product post-processing device, in particular, to a 3D printed post-processing device for removing floating powders.

Description of Related Art

Three-dimensional printing (3DP) technology mainly uses the raw material of powders, such as ceramic, metal, gypsum, plastic powders and so on. 3DP uses a power bed to receive the powder material, and it uses a inject printing head to eject a bonding agent into the powders in order to allow the bonding agent to bond powders together; consequently, through layers of bonding and formation, it is able to create a prototype formation. In general, after the creation of the prototype formation is complete, it is received inside a power cartridge and is buried inside the remaining powder material; therefore, it requires a post-processing device to remove the remaining powders in order to obtain the finished product therefrom. Once the powder cartridge is removed, the remaining powder material then collapses, and the prototype formation is exposed. When a prototype formation comprises separate component parts, the powder material collapses and these parts lose support such that they may fall or collide with each other. Since the bonding agent has not undergone any curing process and treatment, the aforementioned prototype formation may generation deformation or may be damaged once collision occurs.

In view of above, the inventor seeks to overcome the aforementioned drawbacks associated with the currently existing technology after years of research and development along with the utilization of academic theories, which is also the objective of the development of the present invention.

SUMMARY OF THE INVENTION

The disclosure is directed to 3D printed product post-processing device for removing powders.

One of the exemplary embodiments, a 3D printed product post-processing device comprises a main body, a lifting mechanism and a vacuum pipeline. The main body includes an operation chamber formed at an internal thereof. The operating chamber includes a bottom surface comprising a cavity and at least one primary recovery opening arranged at one side adjacent to the cavity. The operating chamber includes a side surface arranged with at least one access hole thereon, and the operating chamber includes an operating window formed thereon. The operation chamber includes another side surface with a top portion having a floating powder recovery opening arranged thereon. The lifting mechanism is accommodated inside the cavity. The vacuum pipeline is connected to the primary recovery opening and the floating powder recovery opening respectively.

In one of the exemplary embodiments of a 3D printed product post-processing device, an edge of the access hole includes at least one brush formed thereon, and the brush covers the access hole. In addition, an edge of the access hole includes a pair of brushes extended therefrom relatively to each other, and the pair of brushes contact with each other.

In one of the exemplary embodiments of a 3D printed product post-processing device, a conical channel is formed between the floating powder recovery opening and the vacuum pipeline; a cone tip of the conical channel is arranged to face downward and is connected to the vacuum pipeline; another end of the conical channel is connected to the floating powder recovery opening. In addition, the conical channel is arranged inside a side wall where the floating powder recovery opening is located.

In one of the exemplary embodiments of a 3D printed product post-processing device, a conical channel is formed between the primary recovery opening and the vacuum pipeline; a cone tip of the conical channel is arranged to face downward and is connected to the vacuum pipeline; another end of the conical channel is connected to the primary recovery opening.

In one of the exemplary embodiments of a 3D printed product post-processing device, the operating chamber includes another access hole formed thereon, and the access hole is arranged on the same side surface where the operating cavity is arranged. In addition, the operating chamber includes secondary window, and the secondary window is arranged between the pair of access holes.

In one of the exemplary embodiments of a 3D printed product post-processing device, the main body includes a door cover pivotally arranged thereon; the door cover covers a top surface of the operating chamber, and the operating view window is arranged on the door cover. In addition, the door cover extends to the side surface where the access hole is located, and the access hole is formed on the door cover. Furthermore, an opening range of the access hole extends to a lower edge of the door cover.

In one of the exemplary embodiments of a 3D printed product post-processing device, the access hole and the floating powder recovery hole are arranged opposite from each other on two sides of the cavity. In addition, the primary recovery opening is located on one side of the floating powder recovery opening, and another side of the floating powder recovery opening includes another primary recovery opening arranged thereon; the pair of primary recover openings are arranged opposite from each other on another two sides of the cavity.

In one of the exemplary embodiments of a 3D printed product post-processing device, the operating chamber includes a spray gun, the main body includes an air compressor installed therein, and the spray gun is connected to the air compressor.

In one of the exemplary embodiments of a 3D printed product post-processing device, the operating window is arranged at a top surface of the operating chamber. In addition, the floating powder recovery opening is arranged adjacent to the operating window.

In the exemplary embodiments presently disclosed, a 3D printed product post-processing device places a powder material and a formation product inside the cavity for securement therein. Next, the lifting mechanism pushes the powder material out of the operating opening layer by layer in order to perform the powder removal post-processing operation. Consequently, it is able to prevent collisions damaging the formation product due to collision during the powder removal process. The operating chamber is equipped with a floating powder recovery opening such that it is able to remove floating powder in order to ensure the cleaning of the operation window and to prevent hindrance to the line of sight of an operator; consequently, the powder cleaning post-processing operation performed by the operator can be facilitated.

DETAILED DESCRIPTION OF THE INVENTION

Figure 1:
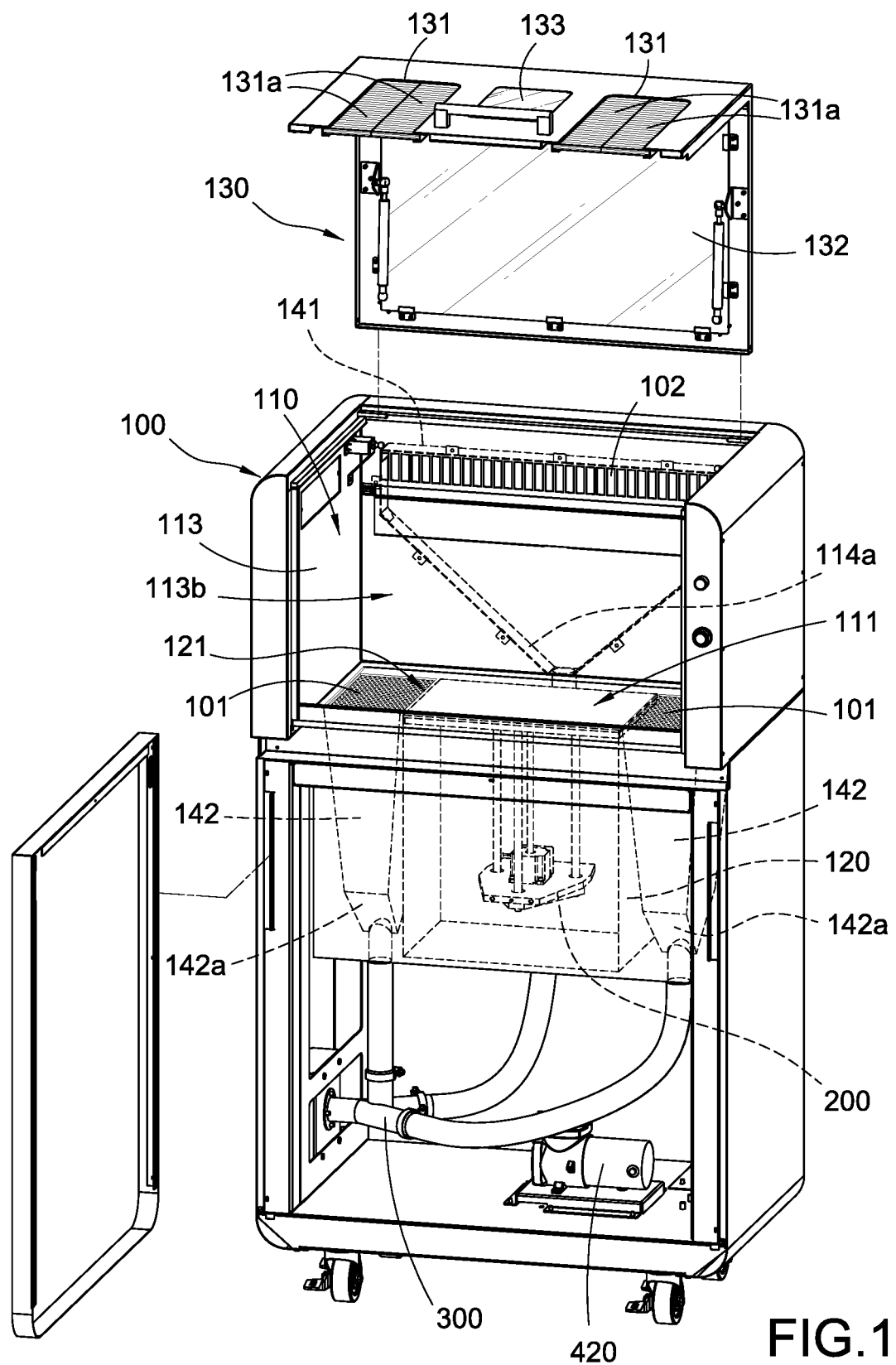
FIG. 1 is a perspective exploded view of a 3D printed product post-processing device according to an exemplary embodiment thereof.

As shown in FIG. 1 to FIG. 6, in an exemplary embodiment, a 3D printed product post-processing device is provided, and it allows a plurality of 3D printed products 30 to be removed from a cartridge 10. The powder cartridge 10 includes a base plate 11 and a plurality of side plates 12 surrounding the base plate 11. The powder cartridge 10 contains a powder material 20 received therein. In an embodiment, the powder material 20 received inside a space formed by the base plate 11 and the side plates 12. In addition, the 3D printed product 30 is buried inside the powder material 20; wherein at least one 3D printed product 30 is separated from the base plate 11 of the powder cartridge 10. In an exemplary embodiment, the 3D printed product post-processing device comprises a main body 100, a lifting mechanism 200 and a vacuum pipeline 300.

In an embodiment, the main body 100 is a housing constructed by metal plates. The main body 100 includes an operating chamber 110 formed at an internal thereof. In an exemplary embodiment, the operating chamber 110 is located in a cubical space on top of the main body 100. The operating chamber 110 includes a bottom surface 111, a top surface 112 opposite from the bottom surface 111 and four side surfaces 113 circumferentially arranged between the bottom surface 111 and the top surface 112. The four side surfaces 113 comprises a front side surface 113a and a rear side surface 113b arranged opposite from each other. The bottom surface 111 of the operating chamber 110 includes a cavity 120 formed thereon and at least one primary recovery opening arranged at one side adjacent to the cavity 120. To be more specific, the main body 100 further includes a cavity 120 formed therein, and the cavity 120 is located underneath the operating chamber 110; in addition, the cavity 120 is connected to the bottom surface 111 of the operating chamber 110 via a rectangular operating opening 121.

The front side surface 113a of the operating chamber 110 is provided with at least one access hole 131 formed thereon in order to allow an operator to reach into the operating chamber 110 to perform post-processing operation. In an exemplary embodiment, the front side surface 113a is provided with a pair of access holes 131 in order to allow an operator to use both hands to reach into the operating chamber 110. The top surface 112 of the operating chamber 110 includes an operating window 132 formed thereon in order to allow an operator to view the operating chamber 110 during the post-processing operation. A secondary window 133 is arranged between the pair of access hole 131 in order to allow an operator to view the operating chamber 110 from the side. The edge of each access hole 131 is provided with at least one brush 131a, and the brush 131a covers the access hole 131. In an exemplary embodiment, the edge of the access hole 131 includes a pair of brushes 131 extended therefrom relatively to each other, and the pair of brushes 131 contact with each other. The brush 131a is able to block the floating powder inside the operating chamber 110 from escaping to the external, in addition when the operator removes his or her hand out of the operating chamber 110, the brush 131a is able to remove the powder material 20 attached onto the hand. The top portion of the rear side surface 113b of the operating chamber 110 includes a floating powder recovery opening 102 arranged adjacent to the operating window 132.

To be more specific, the access hole 131 and the floating powder recovery opening 102 are arranged opposite from each other on two sides of the operating opening 121 of the cavity 120, such that floating powder can be drawn to move toward the floating powder recovery opening 102 in order to prevent the floating powder to escape to the external via the access hole 131. The primary recovery opening 101 is located on one side the floating powder recovery opening 102, and another side of the floating powder recovery opening 102 includes another primary recovery opening 101 arranged thereon such that when the powder material 20 falls into each primary recovery opening 101, the floating powder scattered can be drawn toward the floating powder recovery opening 102. The pair of primary recovery openings 101 are arranged opposite to each other on another two sides of the operating opening 121 of the cavity 120 in order to allow an operator to clean the powder material 20 from different directions.

In an exemplary embodiment, the main body 100 includes a door cover 130 pivotally arranged thereon. In an embodiment, the door cover 130 is an L-shape plate configured to cover the top surface 112 and front side surface 113a of the operating chamber 112 respectively; in addition, the pivotal attachment point is located at the top surface 112 of the operating chamber 110. The door cover 130 can be opened to further open the top surface 112 and the front side surface 113a of the operating chamber 110 in order to facilitate an operator to vertically or horizontally move the formation product 30. The operating window 132 and the access hole 131 are both formed on the door cover 130, and the opening range of the access hole 131 extends to the lower edge of the door cover 130.

The lifting mechanism 200 is accommodated inside the cavity 120 and allows the powder cartridge 10 to be placed thereon. The lifting mechanism 200 can be actuated to lift upward in order to move the powder cartridge 10 in or out of the cavity 120.

The vacuum pipeline 300 is received at the lower portion of the main body 100. The vacuum pipeline 300 is connected to the primary recovery opening 101 and the floating powder recovery opening 102 respectively, and it is also used for connecting to dust collector (not shown in the drawings). The dust collector provides a negative pressure to the primary recovery opening 101 and the floating powder recovery opening 102 in order to attract the powder material 20 via the primary recovery opening 101 and the floating powder recovery opening 102; furthermore, it can also be discharged out of the main body 100 to the dust collector via the vacuum pipeline 300.

A conical channel 141 is connected between the floating powder recovery opening 102 and the vacuum pipeline 300. A cone tip of the conical channel 141 is configured to face downward and is connected to the vacuum pipeline 300. Another end of the conical channel 141 is connected to the floating powder recovery opening 102. Accordingly, the powder material 20 drawn by the floating powder recovery opening 102 is able to fall into the conical chancel 141 and further slide to along the conical channel 141 to reach the cone tip 141*a* of the conical channel 141 such that it can be further discharged via the vacuum pipeline 300. In an exemplary embodiment, the conical channel 141 is of a flat shape and is arranged inside the side wall where the floating powder recovery opening 102 is located, i.e. the rear side surface 113*b* of the operating chamber 110. Similarly, a conical channel 142 is connected between each primary recovery opening 101 and the vacuum pipeline 300. The cone tip of the conical channel 142 is configured to face downward and is connected to the vacuum pipeline 300. Another end of the conical channel 142 is connected to the primary recovery opening 101. Accordingly, the powder material 20 drawn by the primary recovery opening 101 is able to fall into the conical chancel 142 and further slide to along the conical channel 142 to reach the cone tip 142*a* of the conical channel 142 such that it can be further discharged via the vacuum pipeline 300.

The internal of the main body 100 includes an air compressor 420 installed therein. In embodiment, the air compressor 420 is arranged at a lower portion of the main body 100, and a spray gun 410 is connected to the air compressor 420. The air compressor 420 is able to provide a positive air pressure source to the spray gun 410.

Figure 5:
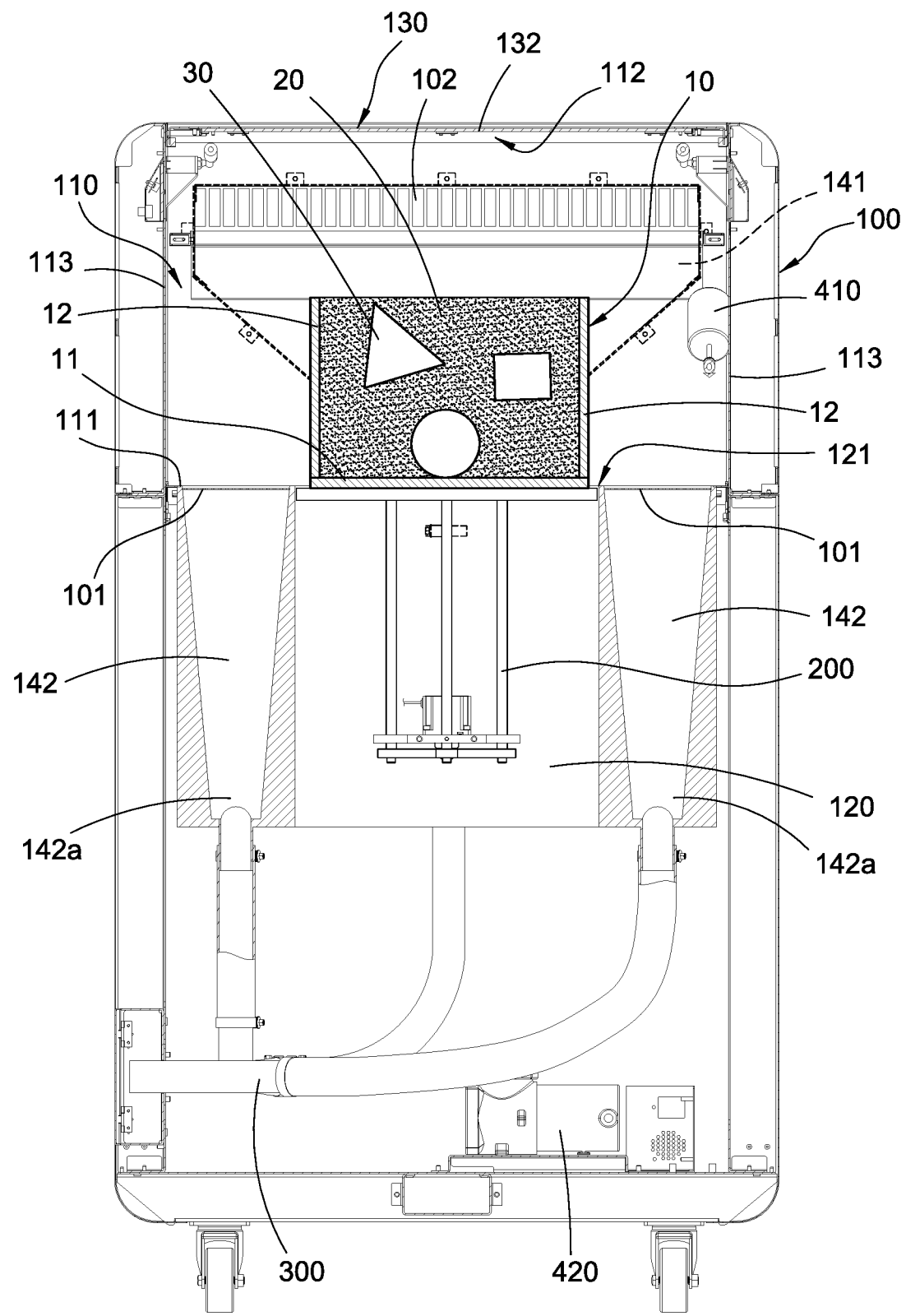
FIG. 5 to FIG. 9 are illustrations showing different states of use of a 3D printed product post-processing device according to an exemplary embodiment thereof.
Figure 6:
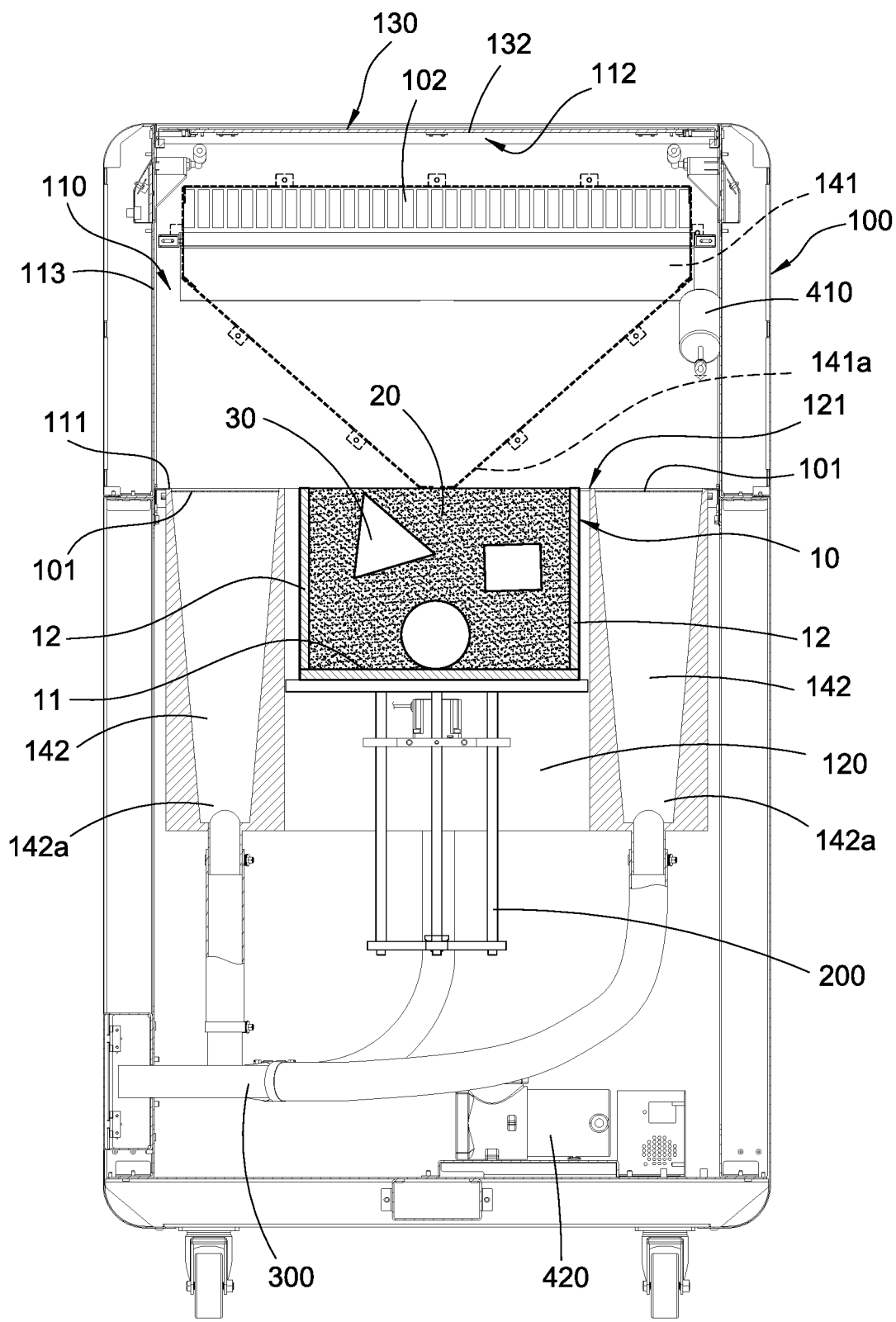
Figure 7:
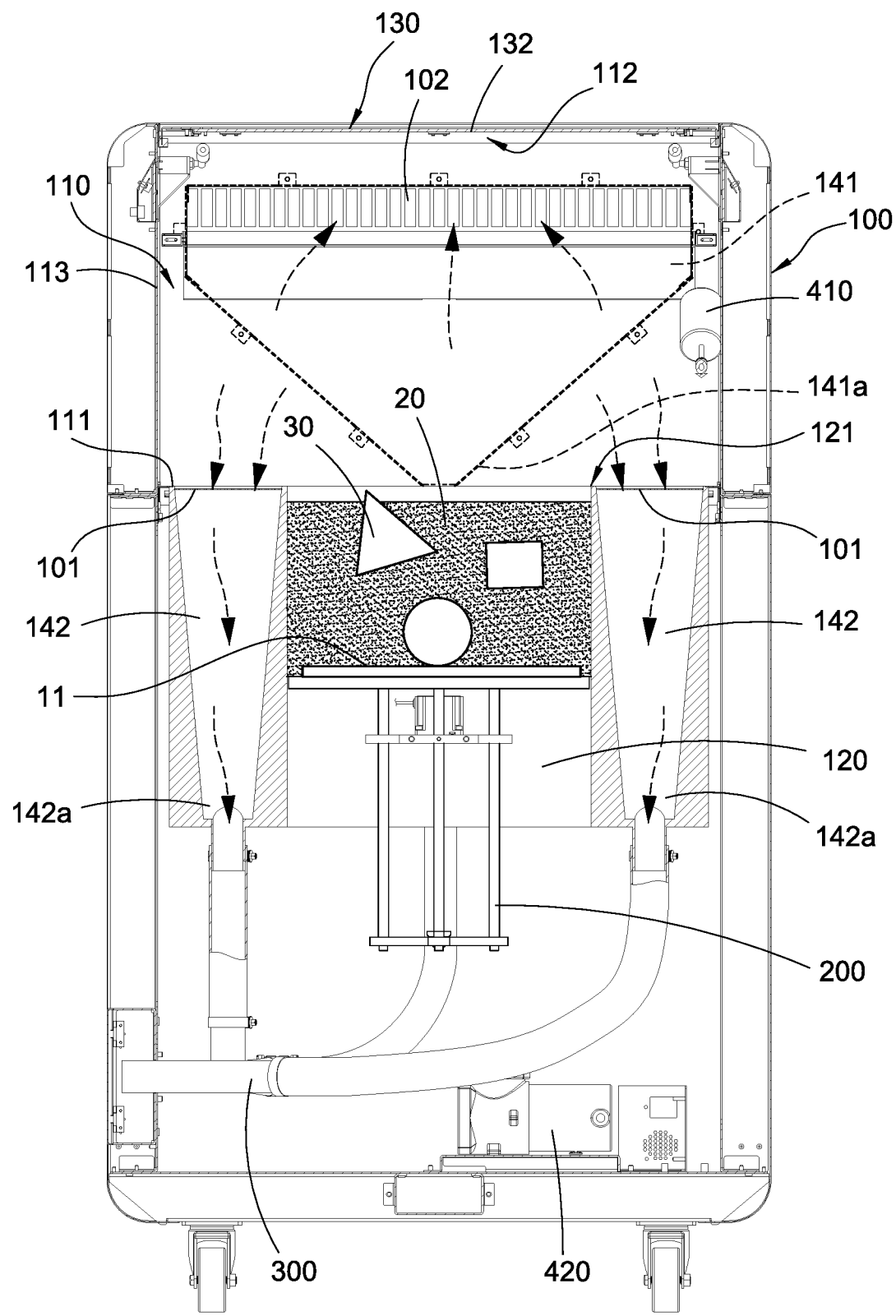
Figure 8:
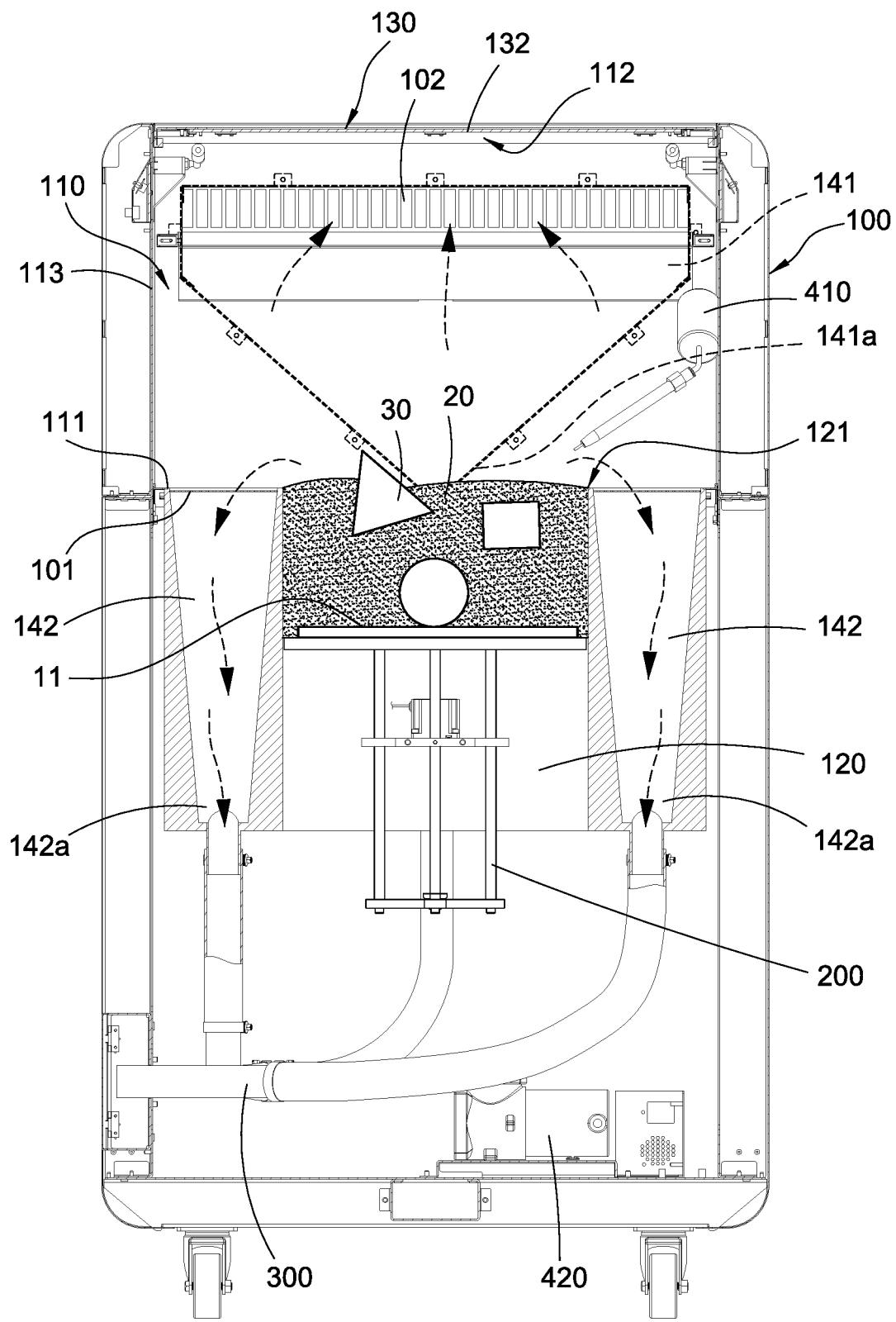
Figure 9:
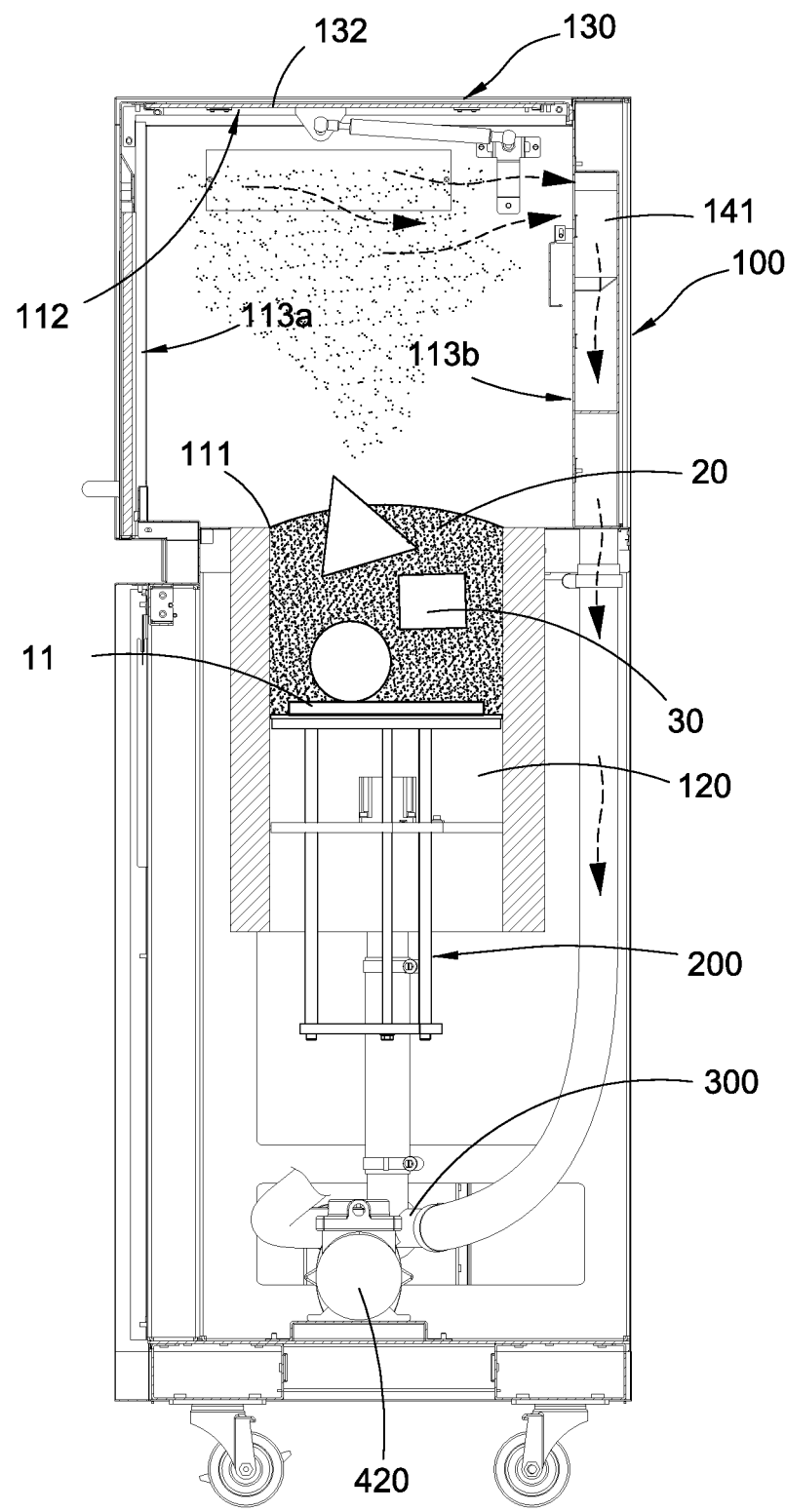

As shown in FIG. 5, during the use of a 3D printed product post-processing device, the top portion of the lifting mechanism 200 is lifted to the operating opening 121, followed by arranging the base plate 11 of the powder cartridge 10 containing the powder material 20 and the formation product 30 therein at the top portion of the lifting mechanism. Next, as shown in FIG. 6 and FIG. 7, the lifting mechanism 200 is lowered to allow the powder cartridge to be fully immersed into the cavity 120, followed by removing the side plates 12 of the powder cartridge 10. Then, as shown in FIG. 8 and FIG. 9, the lifting mechanism is lifted gradually to push the powder material 20 out of the operating opening 121 layer by layer. The operator can use both hands to reach into the operating chamber 110 via the access holes 131 in order to perform subsequent processing operations. The spray gun 410 is then used to blow the powder material 20 exposed at the external of the operating opening 121 into each primary recovery opening 101. During the operation of the spray gun 410, the floating powders caused are removed by the floating power recovery opening 102 in order to prevent floating powder from attaching onto the operating window 132 hindering the vision thereof. The powder material 20 at the operating opening 121 is removed layer by layer repetitively in order to allow the formation product 30 to be exposed. The operator then retrieves the formation product via the access holes 131 in order to perform the subsequent curing operation.

Figure 2:
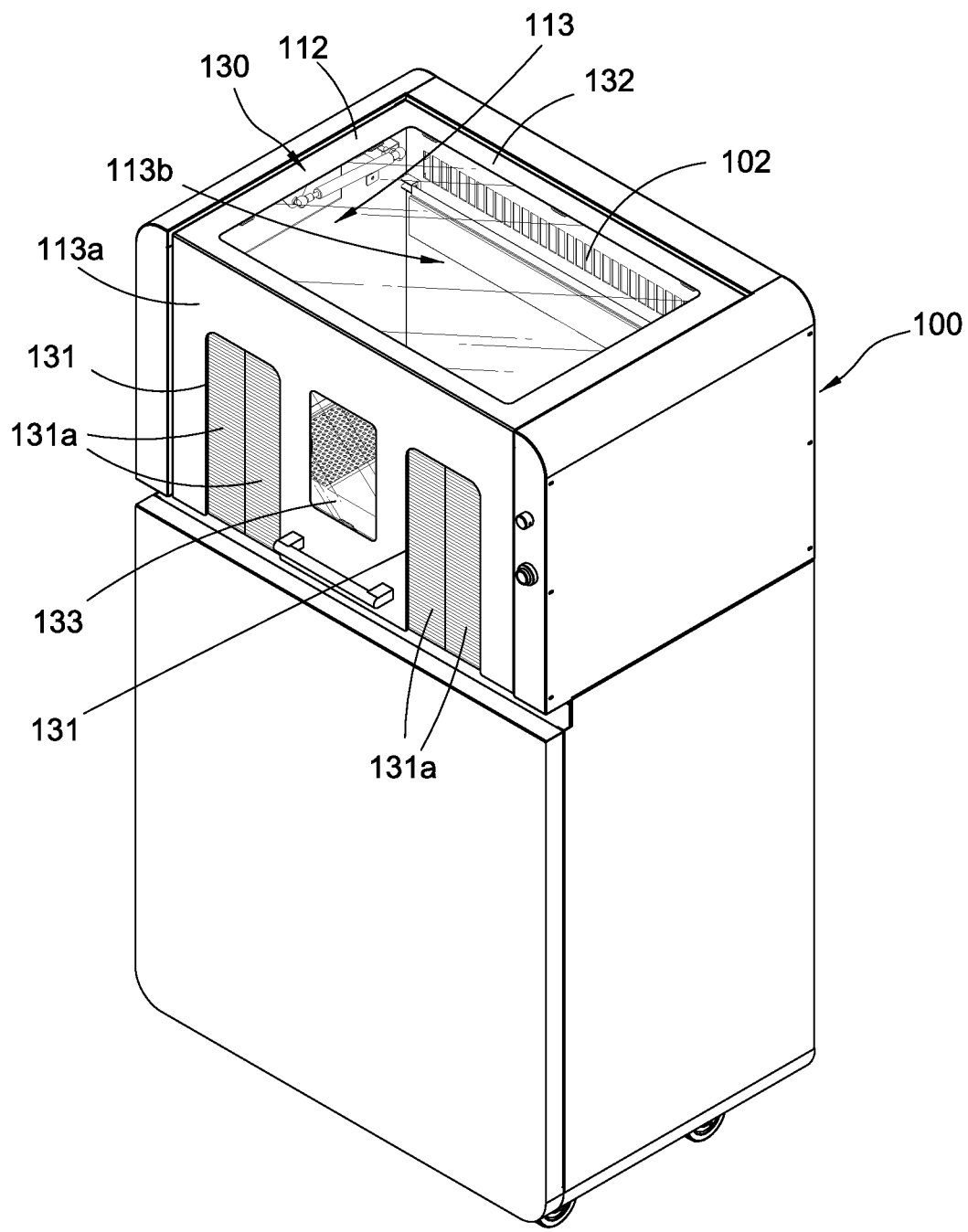
FIG. 2 is a perspective view of a 3D printed product post-processing device according to an exemplary embodiment thereof.
Figure 3:
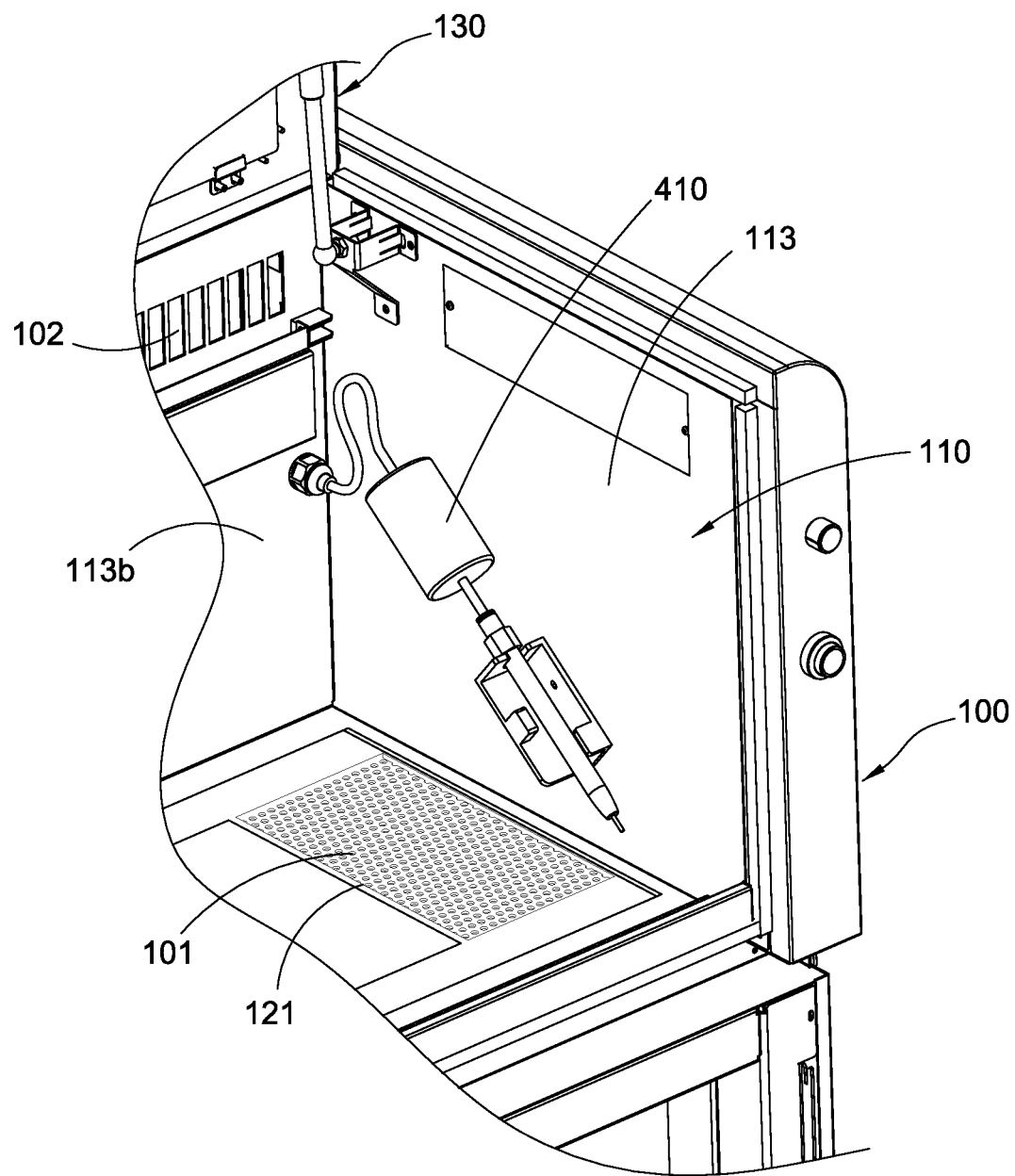
FIG. 3 is a perspective view showing an internal of a 3D printed product post-processing device according to an exemplary embodiment thereof.
Figure 4:
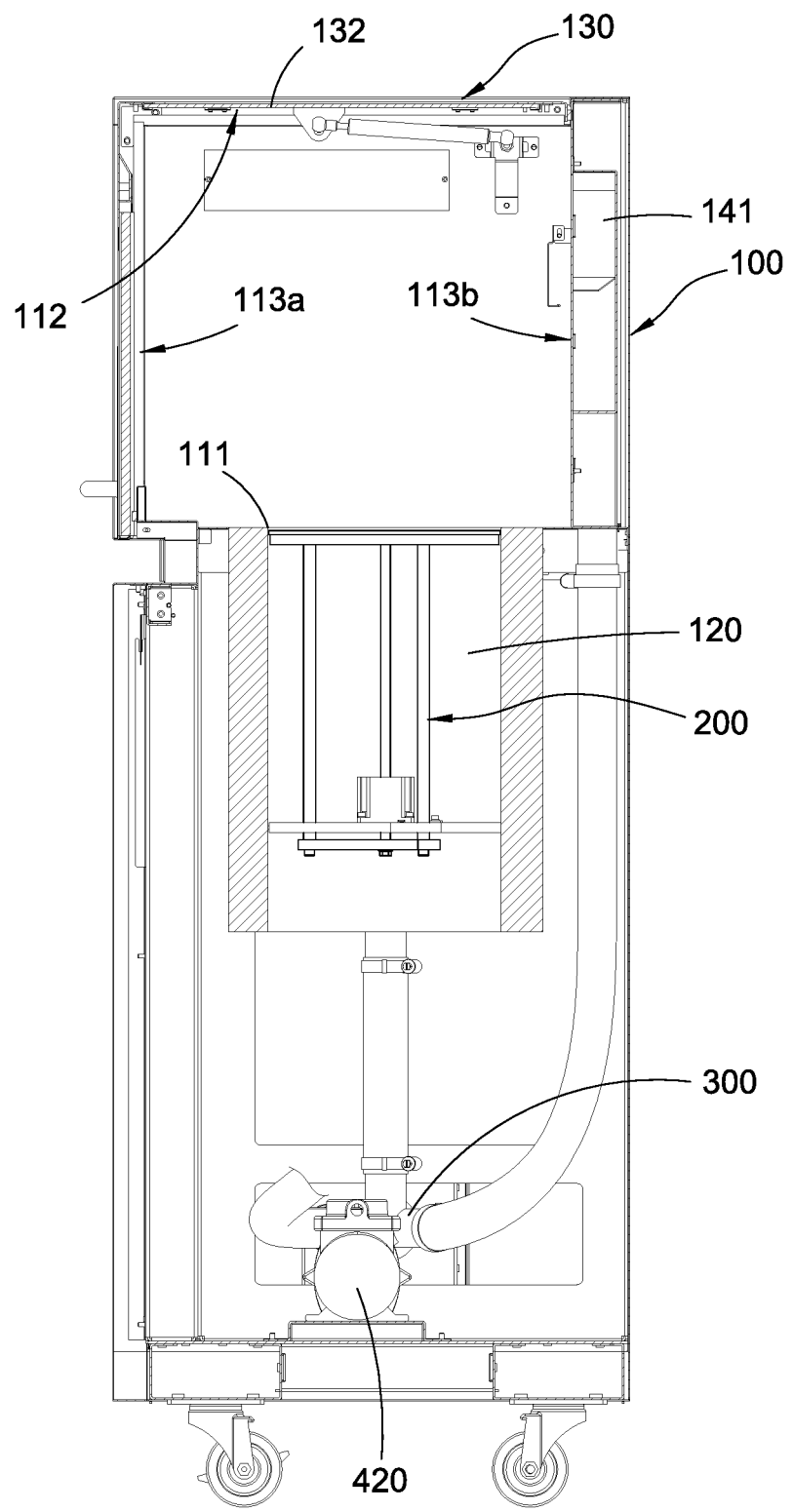
FIG. 4 is a cross sectional view of a 3D printed product post-processing device according to an exemplary embodiment thereof.

As shown in FIG. 1 and FIG. 2, in an exemplary embodiment, the opening range of the access hole 131 extends to the lower edge of the door cover 130. When the volume or size of the formation product 30 is too large to be retrieved out of the access hole 131 and when there is a need for an operator to hold the product for securement, the door cover 130 can be lifted upward in order to allow the hands of the operator to move out of the access hole 131 via the lower edge of the door cover 130; consequently, the retrieval of large formation product 30 can be facilitated.

In an exemplary embodiment, a 3D printed product post-processing device places the powder material 20 and the formation product 30 into the cavity 120 for securement, followed by using the lifting mechanism 200 to push the powder material 20 out of the operating opening 121 layer by layer in order to perform the post-processing operation of the removal of powder material 20. Consequently, it is able to prevent collisions causing damages on the formation product 30 during the powder material 20 cleaning process. In the operating chamber 110, the floating powder recovery opening 102 is arranged therein such that it is able to remove the floating powder in order to ensure the cleanness of the operating window and to prevent any hindrance of the vision of the operator. Consequently, the post-process operation of the removal of powder material 20 can be facilitated.

The above describes the preferable and feasible exemplary embodiments of the present invention for illustrative purposes only, which shall not be treated as limitations of the scope of the present invention. Any equivalent changes and modifications made in accordance with the scope of the claims of the present invention shall be considered to be within the scope of the claim of the present invention.

What is claimed is:

1. A 3D printed product post-processing device, comprising:
    a main body having an operating chamber formed at an internal of the main body; the operating chamber having a bottom surface comprising a cavity and at primary recovery opening arranged adjacent to one side of the cavity; the operating chamber having a side surface, an access hole on the side surface, and an operating window being arranged on the operating chamber; the operation chamber having another side surface with a top portion having a floating powder recovery opening being arranged on the top portion;
    a lifting mechanism accommodated inside the cavity; and
    a vacuum pipeline connected to the primary recovery opening and the floating powder recovery opening respectively;
    wherein a door cover is pivotally arranged on the main body, the door cover forms a top surface of the operating chamber and the door cover forms the side surface of the operating chamber, wherein the access hole is formed on the door cover and wherein the operating view window is arranged on the door cover at the top surface of the operating chamber;
    wherein an opening range of the access hole extends to a lowest edge of the door cover and wherein an edge of the access hole includes a pair of brushes extended toward each other from the edge, and the pair of brushes contact each other.

2. The 3D printed product post-processing device according to claim 1, wherein a conical channel is formed between the floating powder recovery opening and the vacuum pipeline; a cone tip of the conical channel is connected to the vacuum pipeline; an end of the conical channel is connected to the floating powder recovery opening.

3. The 3D printed product post-processing device according to claim 2, wherein the conical channel is arranged inside a side wall where the floating powder recovery opening is located.

4. The 3D printed product post-processing device according to claim 1, wherein a conical channel is formed between the primary recovery opening and the vacuum pipeline; a cone tip of the conical channel is connected to the vacuum pipeline; an end of the conical channel is connected to the primary recovery opening.

5. The 3D printed product post-processing device according to claim 1, wherein another access hole is formed in the door cover, and the access holes are arranged on the same side surface where the operating cavity is arranged.

6. The 3D printed product post-processing device according to claim 5, wherein a secondary window is arranged on the door cover and, and the secondary window is arranged between the access holes.

7. The 3D printed product post-processing device according to claim 1, wherein, when the door cover is in a closed position, the access hole and the floating powder recovery hole opening are respectively arranged at opposite sides of the cavity.

8. The 3D printed product post-processing device according to claim 7, wherein the primary recovery opening is located on one side of the floating powder recovery opening, and another primary recovery opening is arranged on another side of the floating powder recovery opening; the pair of primary recover openings are arranged opposite from each other on another two sides of the cavity.

9. The 3D printed product post-processing device according to claim 1, wherein the operating chamber includes a spray gun, an air compressor is installed in the main body, and the spray gun is connected to the air compressor.

10. The 3D printed product post-processing device according to claim 1, wherein the operating window is arranged at a top surface of the door cover.

11. The 3D printed product post-processing device according to claim 10, wherein the floating powder recovery opening is arranged adjacent to the operating window.

* * * * *